US009756420B2

(12) United States Patent
Zhang et al.

(10) Patent No.: US 9,756,420 B2
(45) Date of Patent: Sep. 5, 2017

(54) DUTY-CYCLING MICROPHONE/SENSOR FOR ACOUSTIC ANALYSIS

(71) Applicant: Texas Instruments Incorporated, Dallas, TX (US)

(72) Inventors: Zhenyong Zhang, Santa Clara, CA (US); Wei Ma, San Ramon, CA (US); Mikko Topi Loikkanen, Saratoga, CA (US); Mark Kuhns, Peoria, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 85 days.

(21) Appl. No.: 14/828,977

(22) Filed: Aug. 18, 2015

(65) Prior Publication Data

US 2016/0212527 A1 Jul. 21, 2016

Related U.S. Application Data

(60) Provisional application No. 62/105,172, filed on Jan. 19, 2015.

(51) Int. Cl.
*H02B 1/00* (2006.01)
*H04R 3/00* (2006.01)

(52) U.S. Cl.
CPC ........... *H04R 3/00* (2013.01); *H04R 2410/00* (2013.01)

(58) Field of Classification Search
CPC .............................. H04R 3/00; H04R 2410/00
See application file for complete search history.

(56) References Cited

U.S. PATENT DOCUMENTS

| | | | | |
|---|---|---|---|---|
| 2012/0200172 A1* | 8/2012 | Johnson | H04R 29/001 | 307/116 |
| 2013/0142350 A1* | 6/2013 | Larsen | H04R 1/1041 | 381/74 |
| 2015/0124979 A1* | 5/2015 | Chien | H04R 29/00 | 381/58 |
| 2015/0215968 A1* | 7/2015 | Jiang | H04W 74/0833 | 370/328 |

* cited by examiner

*Primary Examiner* — Regina N Holder
(74) *Attorney, Agent, or Firm* — John R. Pessetto; Charles A. Brill; Frank D. Cimino

(57) ABSTRACT

A duty-cycled acoustic sensor saves power, for example, by operating for relatively short periods of time in a repetitive manner. A sensor bias current provides operating power to the sensor. An output analog signal from the sensor carries the information induced by the sensor upon the bias signal. Capacitive coupling is employed to remove direct DC voltage from the output analog signal to generate an analog input signal for acoustic analysis. A capacitor for capacitive coupling is pre-charged to reduce the charging time of the capacitor as the sensor is being powered up. After the capacitor is sufficiently precharged, acoustic analysis is performed on the analog input signal. The sensor is powered down by substantially blocking current flow through the sensor, which saves power. Results of the acoustic analysis can be used, for example, to control parameters of the duty-cycling of the acoustic sensor.

6 Claims, 4 Drawing Sheets

DUTY-CYCLING MICROPHONE/SENSOR FOR ACOUSTIC ANALYSIS

CLAIM OF PRIORITY

This application for patent claims priority to U.S. Provisional Application No. 62/105,172 entitled "SOUND RECOGNITION/SENSING WITH DUTY-CYCLING MICROPHONE/SENSOR" filed Jan. 19, 2015 in the United States Patent and Trademark Office, wherein the application listed above is hereby fully incorporated by reference herein for all purposes.

BACKGROUND

Computer systems include processors that are operable to retrieve and process signals from sensors such as acoustic sensors. Such sensors generate signals in response to the sensing of an acoustic wave passing by one or more of such sensors. The acoustic waves can have frequencies that are audible to humans (e.g., 20 Hz through 20 KHz) and/or above (ultrasonic) or below (infrasonic) the frequency sensitivity of the human ear. In various applications, the acoustic sensors are distributed in various locations for purposes such as localization of the origin of the acoustic wave (e.g., by analyzing multiple sensed waveforms associated with the acoustic wave) and/or enhancing security by detecting the presence and location of individual sounds (e.g., by individually analyzing a sensed waveform associated with the acoustic wave). However, difficulties are often encountered with providing power for generating the sensor signals, for example, when numerous sensors exist.

SUMMARY

The problems noted above can be addressed in an acoustic analysis system that includes a duty-cycled acoustic sensor for reducing power consumption. Power is saved, for example, by operating the sensor (as well as portions of processing circuitry the input signal chain) for relatively short periods of time in a repetitive manner. A sensor bias current provides operating power to the sensor, which is developed as a direct current (DC) voltage of an output analog signal. The output analog signal from the sensor carries information induced by the sensor upon the bias signal. Capacitive coupling is employed block the bias voltage at the output analog signal to generate an analog input signal for acoustic analysis. A capacitor for capacitive coupling is pre-charged to reduce the charging time of the capacitor as the sensor is being powered up. After the capacitor is sufficiently pre-charged, acoustic analysis is performed on the analog input signal. The sensor is powered down by substantially blocking current flow through the sensor, which saves power. Results of the acoustic analysis can be used, for example, to control parameters of the duty-cycling of the acoustic sensor as well as portions of circuitry used to process the analog input signal.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "mode" can mean a particular architecture, configuration (including electronically configured configurations), arrangement, application, and the like, for accomplishing a purpose.

Figure 1:
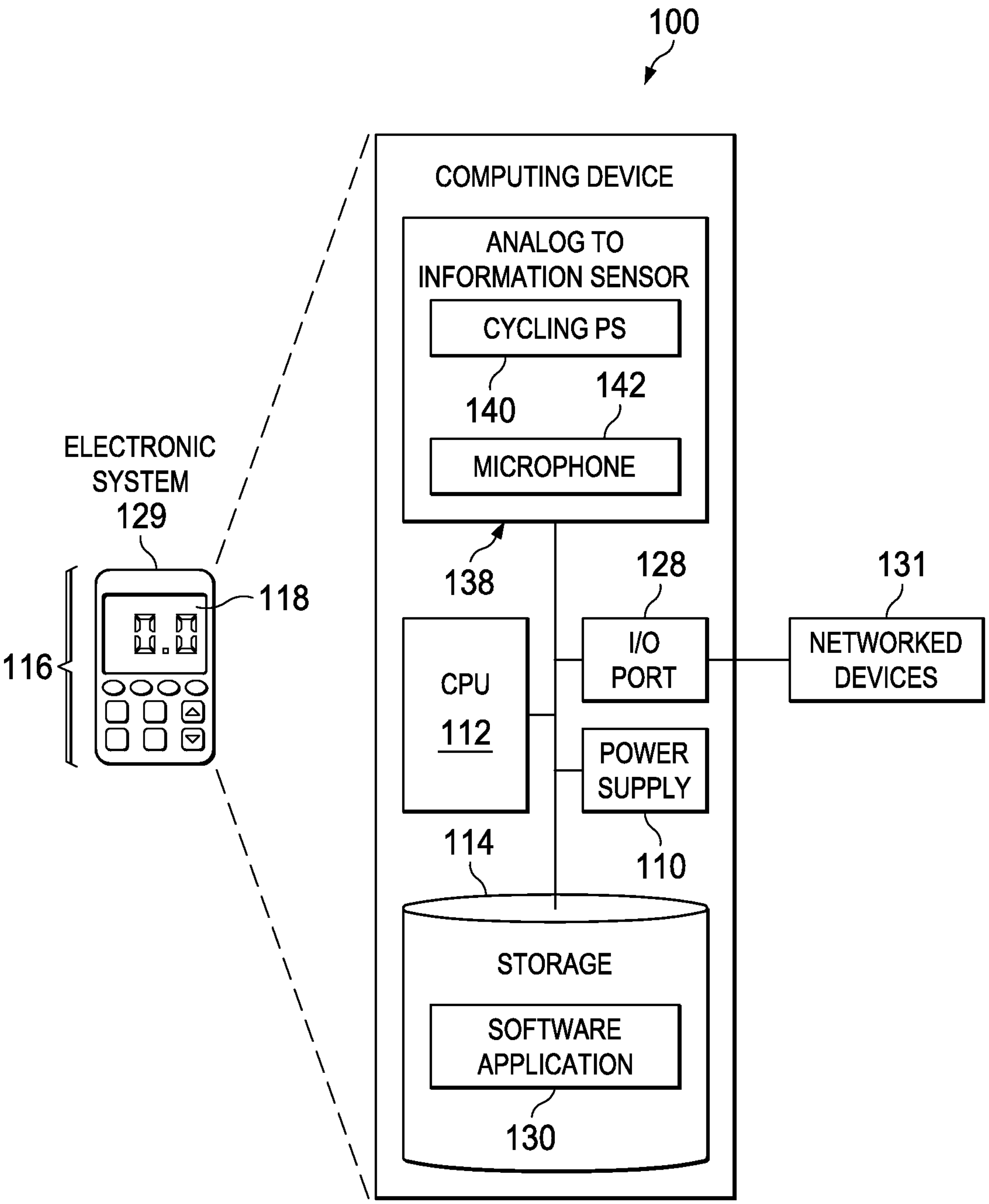
FIG. 1 shows an illustrative electronic device in accordance with example embodiments of the disclosure.

FIG. 1 shows an illustrative computing system 100 in accordance with certain embodiments of the disclosure. For example, the computing system 100 is, or is incorporated into, an electronic system 129, such as a computer, electronics control "box" or display, communications equipment (including transmitters), or any other type of electronic system arranged to generate radio-frequency signals.

In some embodiments, the computing system 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing system 100.

The CPU 112 comprises memory and logic that store information frequently accessed from the storage 114. The computing system 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 is coupled to I/O (Input-Output) port 128, which provides an interface that is configured to receive input from (and/or provide output to) networked devices 131. The networked devices 131 can include any device capable of point-to-point and/or networked communications with the computing system 100. The computing system 100 can also be coupled to peripherals and/or computing devices, including tangible, non-transitory media (such as flash memory) and/or cabled or wireless media. These and other input and output devices are selectively coupled to the computing system 100 by external devices using wireless or cabled connections. The storage 114 can be accessed by, for example, by the networked devices 131.

The CPU 112 is coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing system 100 by external devices using or cabled connections. The CPU 112, storage 114, and power supply 110 can be coupled to an external power supply (not shown) or coupled to a local power source (such as a battery, solar cell, alternator, inductive field, fuel cell, capacitor, and the like).

The computing system 100 includes an analog-to-information sensor 138 (e.g., as a system and/or sub-system). The analog-to-information sensor 138 typically includes a processor (such as CPU 112 and/or control circuitry) suitable for processing sensor quantities generated in response to acoustic waves.

The analog-to-information sensor 138 also typically includes one or more microphones (e.g., sensors) 142 for generating a signal for conveying the sensor quantities. The analog-to-information sensor 138 is operable, for example, to detect and/or determine (e.g., identify, including providing an indication of a relatively likely identification) the presence and/or origin of an acoustic wave with respect to one or more microphones 142. The one or more of the microphones 142 are operable to detect the passing of an acoustic wave, where each such microphone generates a signal for conveying the sensor quantities.

The sensor quantities are generated, for example, in response to periodically sampling (e.g., including at sub-Nyquist sampling rates, as discussed below) the microphones as disclosed herein. The periodic sampling, for example, reduces the power consumption by the bias currents otherwise consumed (e.g., in continuous operation) of the microphones 142.

The analog-to-information sensor 138 can be implemented as an integrated circuit that is physically spaced apart from the microphones 142. For example, the inductive position detector 200 can be embodied as an SoC in the chassis of an electronic system, while the microphones 142 can be located at security vistas (e.g., points-of-entry, aisles, doors, windows, ducts, and the like). The microphones 142 are typically coupled to the SoC using wired connections.

The analog-to-information sensor 138 also included a power supply (PS) such as the cycling power supply 140. The cycling power supply 140 includes circuitry for selectively controlling and powering the microphones 142. The selective controlling and powering of the microphones 142 is typically performed by duty-cycling the operation of the microphones 142, for example, during the times when analog-to-information sensor 138 system is operating in accordance with a selected (e.g., low-power) listening mode. The selective controlling and powering of the microphones 142, for example, provides a substantial reduction in (e.g., analog-to-information sensor 138) system power without requiring the use low (e.g., lower, more expensive, and less sensitive) bias-current microphones 142. (For example, the power consumed by existing systems can be enhanced by using existing, previously installed microphones 142 and associated wiring/cabling in accordance with the techniques disclosed herein.)

The selective controlling and powering of the microphones 142 is operable to maintain a (e.g., present) charge across the AC coupling capacitor, which for example, substantially decreases the latencies of the cycling (e.g., powering-up and powering-down) the microphones 142. Accordingly, the AC coupling capacitor is operable, for example, to capacitively couple an analog input signal to the input of an amplifier for buffering AC components of the analog input signal and to block DC components of the analog input signal after a period of time in accordance with an RC (resistive-capacitive) time constant associated with the coupling capacitor has expired.

The substantial decrease in such latencies afforded by the power cycling allows, for example, reducing power during time intervals to the microphones 142 without noticeably reducing the security provided by the analog-to-information sensor 138 system. As disclosed herein, maintaining the charge across the AC coupling capacitor, for example, reduces the otherwise slow settling of relatively large (e.g., with respect to sampling frequencies) of the AC coupling capacitor (e.g., discussed below with respect to FIG. 4).

Figure 2:
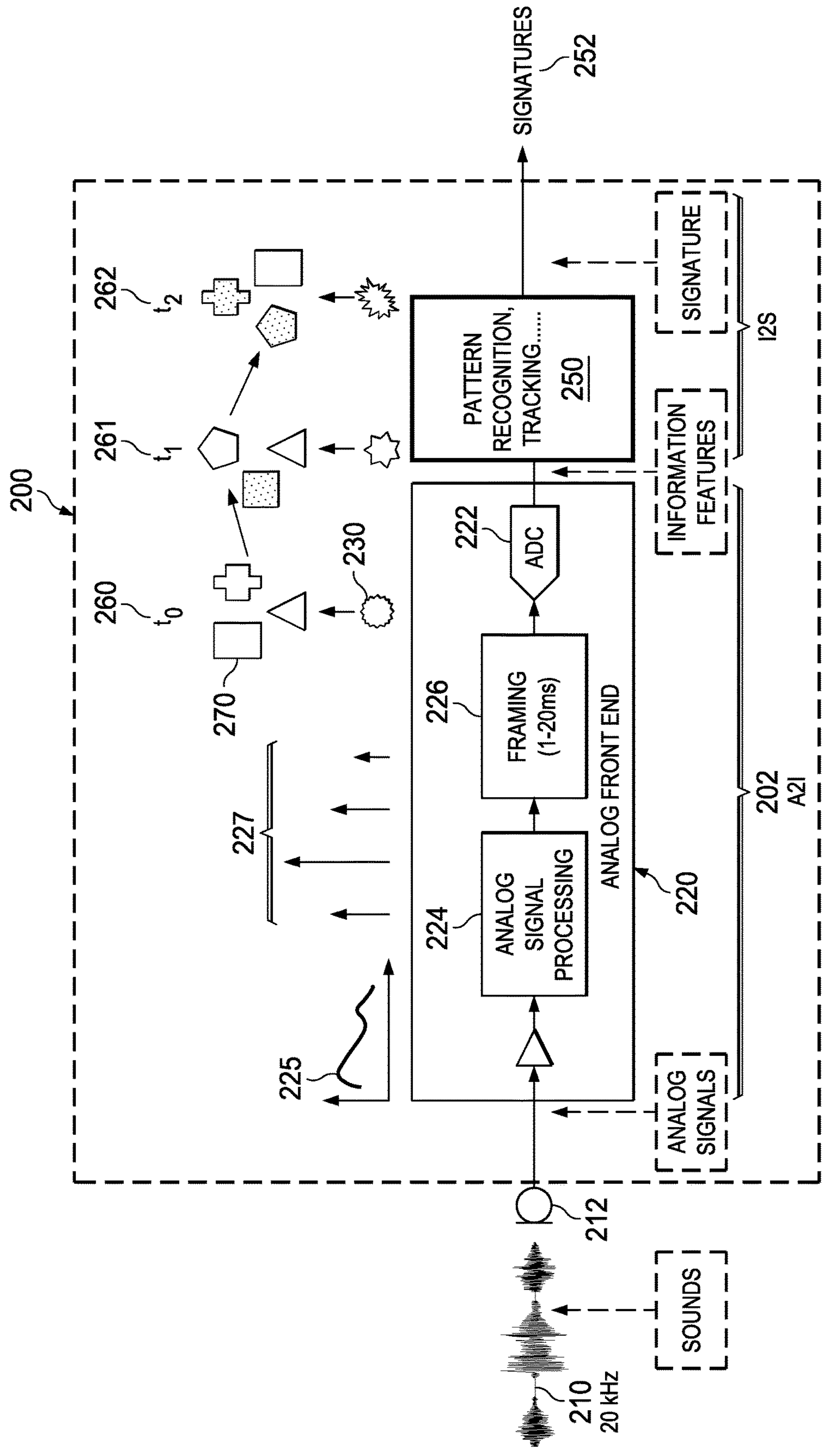
FIG. 2 is a functional diagram illustrating analog-to-information (A2I) operation of a sound recognition system in accordance with embodiments of the disclosure.

FIG. 2 is a functional diagram illustrating analog-to-information (A2I) operation of a sound recognition system 200 in accordance with embodiments of the disclosure. The sound recognition system, for example, is (or is included with in) the analog-to-information sensor 138 system. Generally described, the sound recognition system 200 operates on sparse information 424 extracted directly from an analog input signal and, in response, generates information for identifying parameters of the acoustic wave 210 from which the analog input signal is generated (e.g., by microphone 212).

In operation, the sound recognition system ("recognizer") 200 operates upon sparse information 224 extracted directly from an analog input signal. The recognizer 200 sparsely extracts frame-based (e.g., during a relatively short period of time) features of the input sounds in the analog domain. The recognizer 200 avoids having to digitize all raw data by selectively digitizing (e.g., only) the extracted features extracted during a frame. In another words, the recognizer 200 is operable to selectively digitizes information features during frames.

The recognizer 200 accomplishes such extraction by performing pattern recognition in the digital domain.

Because the input sound is processed and framed in the analog domain, the framing removes most of the noise and interference typically present within an electronically conveyed sound signal. Accordingly, the digitally performed pattern recognition typically reduces the precision (e.g., otherwise) required for a high-accuracy analog-front-end (AFE, which would, otherwise, perform the recognition in the analog domain) 220.

An ADC 222 of the AFE 220 samples the frame-based features, which typically substantially reduces both the speed and performance requirements of the ADC 222. For frames as long as 20 ms, the sound features may be digitized at a rate as slow as 30 Hz, which is much lower than the input signal Nyquist rate (typically 40 KHz for 20 KHz sound bandwidth). The relatively moderate requirements for the performance of the AFE 220 and ADC 222, relatively extremely low power operation of the AFE 220 and the ADC 222 of the recognizer 200 can be accomplished.

The relatively low power consumption of the recognizer 200 allows the recognizer 200 system to be operated in a continuous manner so that the possibility of missing a targeted event is reduced. Also, because the system 200 (e.g., only) sparsely extracts sound features, the extracted features are extracted at a rate that is not sufficient to be used to reconstruct the original input sound, which helps assure privacy of people and occupants of spaces surveilled by the recognizer 200.

The analog input signal generated by microphone 212 is buffered and coupled to the input of the analog signal processing 224 logic circuitry. The analog signal processing 224 logic (included by analog front end 220) is operable to perform selected forms of analog signal processing such as one or more selected instances of low pass, high pass, band pass, band block, and the like filters. Such filters are selectively operable to produce one or more filtered-output channels, such as filtered-output channel 225. The analog channel signals generated by the analog signal processing 224 logic, is selectively couple to the input of analog framing 226 logic circuitry. The length of each frame may be selected for a given application, where typical frame values may be in the range of 1-20 ms, for example.

After framing, a resultant value for each channel is selectively digitized by ADC 222 to produce a sparse set of digital feature information as indicated generally at 227. A relatively low cost, low power sigma-delta analog to digital converter can be used in accordance with the relatively low digitalization rate that is used by the recognizer 200. For example, a sigma/delta modulation analog-to-digital converter (ADC) is used to illustrate an embodiment (although the use of other types ADCs is contemplated).

The rudimentary delta sigma converter (e.g., ADC 222) is a 1-bit sampling system. An analog signal applied to the input of the converter is limited to including sufficiently low frequencies such that the delta sigma converter can sample the input multiple times without error (e.g., by using oversampling). The sampling rate is typically hundreds of times faster than the digital results presented at the output ports of recognizer 200. Each individual sample is accumulated over time and "averaged" with the other input-signal samples through digital/decimation filtering.

The primary internal cells of the sigma delta ADC are the modulator and the digital filter/decimator. While typical Nyquist-rate ADCs operate in accordance with one sample rate, the sigma delta ADC operates in accordance with two sampling rates: the input sampling rate (fS) and the output data rate (fD). The ratio of the input rate to the output rate is the "decimation ratio," which helps defines the oversampling rate. The sigma delta ADC modulator coarsely samples the input signal at a very high fS rate and in response generates a (e.g., 1-bit wide) bitstream. The sigma delta ADC digital/decimation filter converts the sampled data of the bit stream into a high-resolution, slower fD rate digital code (which contains digital information features of the sounds sampled by microphone 212).

The sound information features from the sigma delta ADC 222 is selectively coupled to an input of the pattern recognition logic 250 (which operates in the digital domain). The recognition logic 250 is operable to "map" (e.g., associate) the information features to sound signatures (I2S) using pattern recognition and tracking logic. Pattern recognition logic 250 typically operates in a periodic manner as represented by time points t(0) 260, t(1) 261, t(2) 262, and so forth. For example, each information feature, as indicated by 230 for example, is compared (e.g., as the information feature is generated) to a database 270 that includes multiple features (as indicated generally at 270). At each time step, the pattern recognition logic 250 attempts to find match between a sequence of information features produced by ADC 222 and a sequence of sound signatures stored in data base 270. A degree of match for one or more candidate signatures 252 is indicated by a score value. When the score for a particular signature exceeds a threshold value, the recognizer 200 selectively indicates a match for the selected signature.

The pattern recognition logic 250 operates in accordance with one or more type of conventional pattern recognition techniques, such as a Neural Network, a Classification Tree, Hidden Markov models, Conditional Random Fields, Support Vector Machine, and the like. The pattern recognition logic 250 may perform signal processing using various types of general purpose microcontroller units (MCU), a specialty digital signal processor (DSP), an application specific integrated circuit (ASIC), and the like.

Accordingly, the recognizer 200 is operable to (e.g., at a high level) operate continuously, while consuming a relatively small amount of power. The recognizer 200 is operable to continually monitor incoming waveforms for one or more expected types of sounds. The expected types of sounds includes categories such as gun-shot sounds, glass break sounds, voice commands, speech phrases, (encoded) music melodies, ultrasound emissions for electric discharge (e.g., such as an electrical arc generated by a piece of equipment), ultrasonic earthquake compression waves (e.g., used to provide imminent warning of just-initiated earthquakes) and the like.

In various applications, various embodiments of the AFE 220 is operable to wake up devices in response to the receipt of an expected sound. For example, systems such as a mobile phone, tablet, PC, and the like, can be awakened from a low power mode in response to detecting a particular word or phrase spoken by a user of a system.

In an example application, the AFE 220 is operable to classify background sound conditions to provide context awareness sensing to assist in device operations. For example, speech recognition operation may be adjusted based on AFE 220 detecting that it is in an office, in a restaurant, driving in a vehicle or on train or plane, etc.

In an example application, the AFE 220 is operable to detect selected sounds to trigger alarms or surveillance camera. The selected sounds includes one or more entries such as a gunshot, glass break, human speech (in general), footfall, automobile approach, and the like (e.g., where the entries of the associated features are stored in database 270). The selected sounds can include sounds that provide an indication of abnormal operation conditions of a motor or engine operation, electric arcing, car crashing, breaking sound, animal chewing power cables, rain, wind, and the like.

Figure 3:
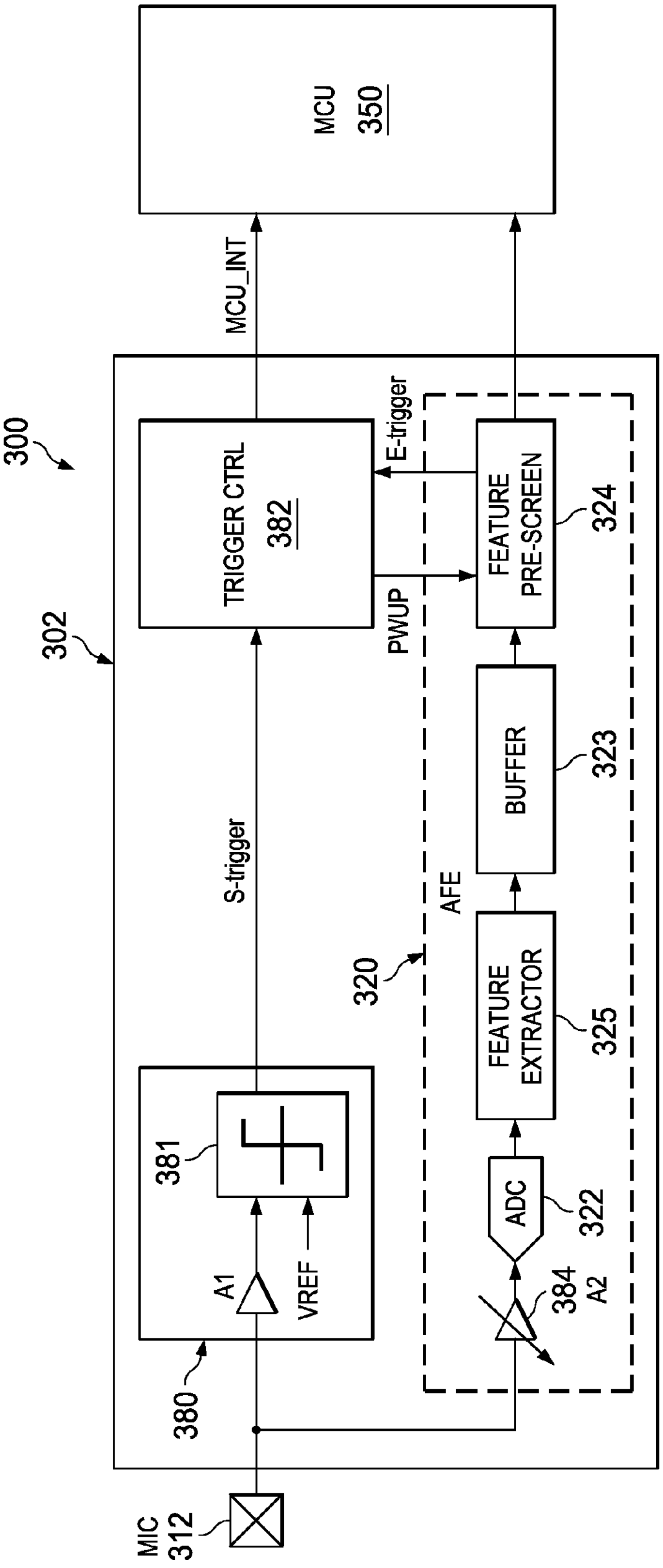
FIG. 3 is a functional diagram illustrating analog-to-information (A2I) operation of another sound recognition system in accordance with embodiments of the disclosure.

FIG. 3 is a functional diagram illustrating analog-to-information (A2I) operation of another sound recognition system (300) in accordance with embodiments of the disclosure. The sound recognition system 300 includes an analog front 320 channel, signal trigger 380 logic circuitry, and trigger control (Trigger CTRL) 382.

The signal trigger 380 evaluates the condition of the analog signal (e.g., generated by microphone 312) with respect to typical background noise from the environment to decide whether the signal chain (e.g., via the AFE 320 channel) is to be awakened. Assuming a quiescent, normal background (e.g., when no unexpected events occur) exists, the AFE channel 320 logic is maintained (e.g., by the trigger control 382) in a power off state (e.g., most of the time). When the signal trigger 380 detects (e.g., using comparator 381 and 430, described below) a certain amount of signal energy in the sound input signal, then the signal trigger 380 is operable to assert a "sound detected" trigger (S-trigger) control signal for turning on power for the AFE 320 channel. The microcontroller 350 (of sound recognition system 300) is operable to perform pattern recognition using digital signal processing techniques as described above.

The signal trigger 380 includes input gain circuitry A1, which is operable to buffer the analog input signal 312. The analog input signal generated by microphone 312 is compared (by comparator 381) against an analog threshold "Vref." When the analog input signal rises is higher than "Vref," the output of comparator 381 is toggled from "0" to "1" to generate the S-trigger signal, which indicates that a sufficiently large input signal has been received. When the analog input signal remains at levels below "Vref," the entire AFE 320 can be placed in a power down mode until a sufficiently larger sound causes the S-trigger signal to be asserted (e.g., toggled high).

After the S-trigger signal is toggled to a high logic signal, the trigger control 382 directs the AFE 320 to start collecting the input signal and perform frame-based feature extraction. The frame-based feature extraction is initiated by buffering the input analog signal via the input gain circuitry A2 (354), extracting features from the raw digitally sampled data, and sampling the buffered analog input signal using ADC 322.

The feature extractor 325 is circuitry operable to extract feature information from the (e.g., filtered and decimated) output of the ADC 322. The feature information can be extracted, for example, by determining various deltas of time-varying frequency information within frequency bands over the duration of the sampled frame to produce a digital signature with which to perform an initial analysis and/or with which to search a library (e.g., within database 270) for a match.

The extracted feature for each frame is successively stored in buffer 323 (which can be arranged as a circular buffer). To save even more power, the trigger control block 382 is operable to "escrow" the S-trigger signal with respect to microcontroller 350 for a period of time during which the AFE 320 processes an initial set of frames stored the buffer 323. The AFE processes an initial set of frames (e.g., using a less-rigorous examination of the captured frames) to determine whether additional power should be expended by turning on the MCU 350 to perform a further, more-powerful analysis of the captured frames.

For example, the AFE 320 can buffer an initial truncated set of several frames of sound features in buffer 323 and perform (digital) pre-screening using feature pre-screen 324 logic circuitry. Accordingly, the pre-screening allows the AFE 320 to determine (e.g., in response to the power up (PWUP) signal) whether the first few frames of features are likely a targeted sound signature before releasing the escrowed wakeup signal (e.g., via signal E-trigger). Releasing the escrowed signal wakes up the MCU 350 (where the wake up activity entails a relatively high power expenditure) to collect the extracted features and perform more complicated and accurate classifications. For example, buffer 322 may buffer five frames that each represent 20 ms of analog signal. In various embodiments, the PWUP signal can be used to control cycling the power to a portion of the AFE 320.

The trigger control 382 is operable to determine whether the MCU 350 classifier is to be powered up for performing full signature detection, as discussed above. The event trigger 382 selectively operates in response to one AFE channel feature as identified by pre-screen logic 324 circuitry or operate in response to a combination of several channel features to signal a starting point. Pre-screen logic 324 may include memory that stores a database of one or more truncated sound signatures that the pre-screen logic 324 uses to compare against the truncated feature samples stored in buffer 323 to determine whether a match exists. When such a match is detected, the event trigger signal E-trigger is asserted, which instructs the trigger control logic 382 to wake up the MCU 350 in preparation for performing a relatively rigorous sound recognition process on the sparse sound features being extracted from the analog signal provided by microphone 312.

During active operation, the MCU 350 consumes more power than the AFE 320. The AFE 320 in active operation consumes more power than the signal trigger 380, in which the comparator 381 typically is a very low power design. Accordingly, the disclosed triggering scheme minimizes the frequency of waking up the "power-hungry" MCU 350 and the feature pre-screener 324 such that the power efficiency of the sound recognition system 300 is maximized.

Figure 4:
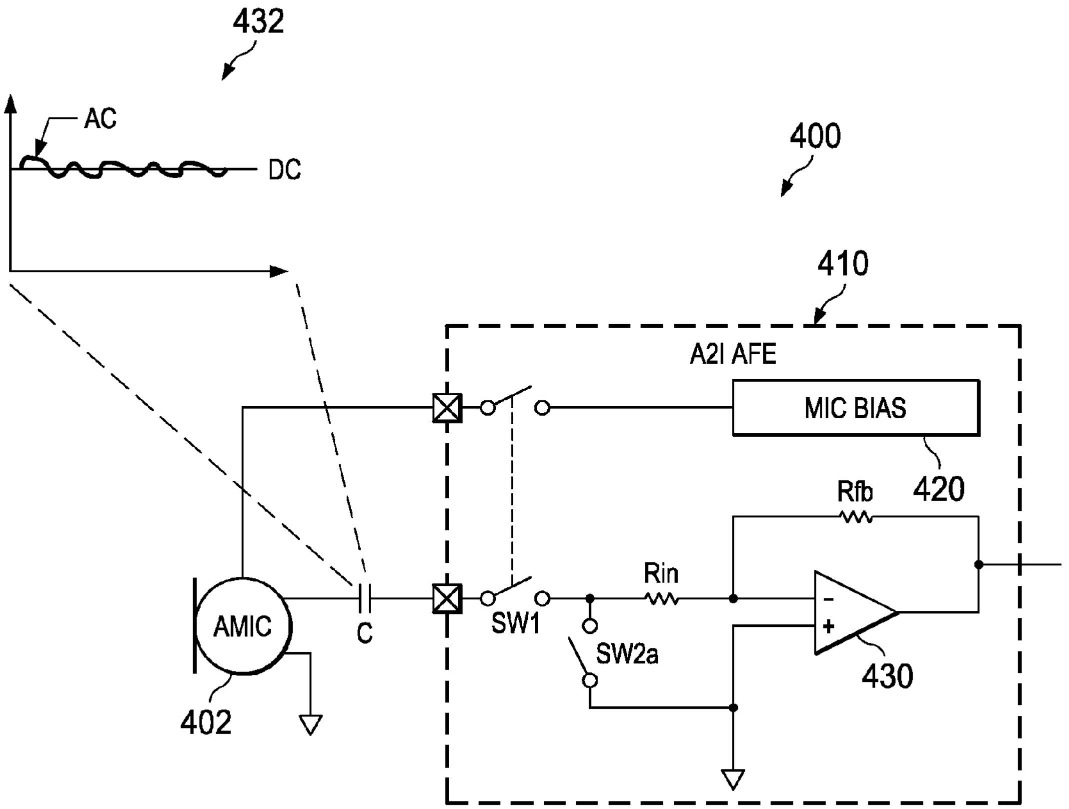
FIG. 4 is a functional diagram illustrating input gain circuitry of an analog-to-information (A2I) operation of a sound recognition system in accordance with embodiments of the disclosure.

FIG. 4 is a functional diagram illustrating input gain circuitry of an analog-to-information (A2I) operation of a sound recognition system in accordance with embodiments of the disclosure. The input gain circuitry 410 is operable for controlling microphone bias current of the analog microphone (AMIC) 402. The input gain circuitry 410 includes a microphone bias current generator (MIC BIAS) 420 for generating power for biasing the (e.g., diaphragm of the) microphone 402 and generating the input analog signal.

The microphone 402 generates the analog input signal (e.g., in response to an acoustic wave disturbing the diaphragm of the microphone 402) using power received from the microphone bias current signal. The analog input signal is AC-coupled to the input of the input gain circuitry 410 via coupling capacitor "C." Coupling capacitor C is typically in the range of 10-1000 microFarads and (accordingly) has relatively (e.g., in view of the output impedance of the microphone 402) slow charge/discharge times (e.g., in view of the frequencies to be sampled).

The selective controlling and powering of the microphone 420 by switches SW1 and SW2A is operable to maintain a (e.g., present) charge across the coupling capacitor C (which is operable to filter, e.g., remove, DC components of a signal). The timing of the switches SW1 and SW2 (e.g., further described below with reference to FIG. 5) is operable to substantially decrease the latencies of the cycling (e.g., powering-up and powering-down) the microphone 402 performed to conserve power. For example, when switches SW1 and SW2 are both closed, the coupling capacitor is pre-charged to reduce latencies associated with charging the coupling capacitor C when the couple capacitor is coupled to a relatively high-impedance input (e.g., associated with operational amplifier 430).

For example, when switch SW1 is closed (and after the latency of the coupling capacitor C is satisfied), an AC component (e.g., superimposed upon the DC component) of signal 432 is (selectively) coupled to a first input of the operational amplifier 430 via resistor Rin. The second input of the operational amplifier 430 is coupled to ground (e.g., convenient reset voltage). The operational amplifier 430 of input gain circuitry 410 is operable to buffer (e.g., control the gain of) the analog input signal in accordance with the ratio of resistor Mb (which limits the feedback current of the output to the first input of the operational amplifier 430) to resistor Rin. Accordingly, the input gain circuitry 410 is operable to generate a (e.g., variably) buffered analog input signal in response to the analog input signal generated by the microphone 402. The buffered analog input signal in various embodiments is coupled to the input of analog signal processing block 224 (described above with respect to FIG. 2) and/or coupled to the input of ADC 322 (described above with respect to FIG. 3).

When SW1 is opened, the current of the DC component for powering the acoustic sensor is blocked such that power consumption of the microphone is substantially reduced or eliminated. Other portions of the sound recognition system (including the MCU 350 and portions of the AFE 320) are selectively powered down when SW1 is opened to save power.

Figure 5:
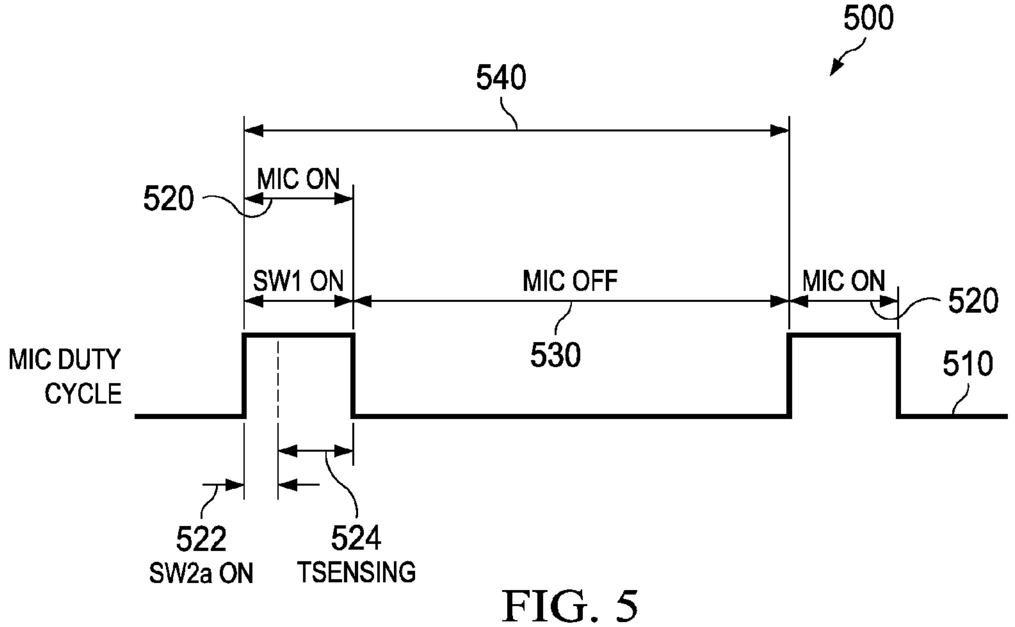
FIG. 5 is a timing diagram illustrating timing of input gain circuitry of an analog-to-information (A2I) operation of a sound recognition system in accordance with embodiments of the disclosure.

FIG. 5 is a timing diagram illustrating timing of input gain circuitry of an analog-to-information (A2I) operation of a sound recognition system in accordance with embodiments of the disclosure. Signals 510 and The microphone operating power (e.g., the bias current for microphone 402 and/or other acoustic sensors) signal 510 is cycled having an on-time of 520 and an off-time of 530. The pulse (generated during time 520) is applied at a pulse repetition frequency in accordance with cycle-time 540. The During the rising edge of signal 510 at on-time 520 switches SW1 and SW2 are toggled to a closed position (e.g., which conducts current). The closing of switch SW1 activates the microphone by sourcing and sinking the microphone bias current (e.g., as modulated by a diaphragm of the microphone). The closing of switch SW2*a* shunts the current from SW1 to ground, which quickly charges the coupling capacitor C to an optimal bias point during (e.g., capacitor latency) time 522. At the expiration of (capacitor latency) time 522, switch SW2*a* is opened (while switch SW1 remains closed) which couples (e.g., sinks) the AC components of the analog input signal (e.g., signal 432) to the first input of the operational amplifier (e.g., 430).

Switch SW1 remains closed during the sensing time (TSENSING) 524. During the sensing time 524, the microphone remains actively powered and the analog input signal, for example, is buffered, sampled and analyzed to produce a frame of information features as described above.

At the expiration of the sensing time 524 (and the microphone on-time 520), switch SW1 is opened, which removes operating power from the microphone (e.g., to save power) and decouples the coupling capacitor C to save any charge present in the capacitor (e.g., which helps to decrease the capacitor settling time of the next cycle), and the microphone off-time 530 is entered. During time 530 one or more of the microphone, the recognizer (e.g., MCU 350), and portions of the AFE (220 or 320) can be selectively (individually or collectively) powered down to save power. As described above, the MCU 350 is (e.g., only) powered up after one or more frames have been analyzed to determine whether the sampled frames likely include features of interest.

The time-on period 510 is typically around the range of around 1 milliseconds to 5 milliseconds. The time-off period 520 is typically around the range of around 4 milliseconds to 15 milliseconds. Accordingly, the cycle-time 540 is typically around the range of around 5 milliseconds to 20 milliseconds, a frame duration is around the range of around 5 milliseconds to 20 milliseconds, and the resulting the duty cycle is, for example, around 20 percent.

The duty cycle of the microphone can be determined as the ratio of the duration of the time-on period 510 to the duration of the cycle-time. To discriminate between analyzing spoken language (which may violate trust and/or applicable laws) and monitoring for sound features, the microphone duty cycle and the pulse repetition frequency (which is typically the reciprocal of the cycle-time 540) are selected such that a substantial portion of words and/or sentences are not (e.g., cannot) analyzed for speech spoken at normal rates. As disclosed herein, the power cycling the bias current to effect such discrimination (e.g., between having the capability of detecting speech as opposed to determining the contents) can also be used to reduce the power otherwise consumed by a system arranged for acoustic surveillance.

The frequency cut-off (e.g., Nyquist frequency) and (e.g., digitizing) sampling rates (e.g., using sub-Nyquist sampling) can be used in combination with the above techniques to render the sampled speech to be unintelligible (e.g., on a word-by-word based) while, for example, still being recognizable as human speech. In an embodiment, the libraries of selected features (e.g., entries of types of sounds) are analyzed and stored in the database (e.g., 270) in accordance with the expected microphone on-times, the pulse repetition frequency, the cut-off frequency, and the sampling rate.

In an embodiment, a particular sound type (e.g., feature) can be stored as multiple entries where each successive entry has a higher resolution (e.g., having increases in one or more of expected microphone on-times, the pulse repetition frequency, the cut-off frequency, and the sampling rate) than a previous entry for the particular sound type. When an initial match for a frame-based extracted feature sample is encountered using a stored entry of lesser resolution (e.g., using a less-rigorous, less power-consuming analysis), a more powerful analysis (e.g., such as by a DSP using more power) can be performed to determine whether a match exists for a higher resolution entry that is associated with the particular sound type for the initial match was made. For example, performing searches for matches using higher resolution stored features decreases the incidence of false positives and increases the accuracy of the type of sound detected.

In various embodiments, the successful determination of an initial match is used to trigger the generation of a warning (such as an intelligible/visual to persons within the surveilled environment and/or surveillance system for logging events associated with the initial match), for example, to increase security and/or maintain compliance with applicable laws.

The time-on period 510 of a first microphone can be initiated at a time different from a time-on period 510 of a second microphone such that the two periods do not substantially overlap. The non- (or partially) overlapping time-on periods 510 helps ensure a more even consumption of power by sequentially (e.g., or alternating) powering the first and second (e.g., and other) microphones at different times.

Two or more microphones can be activated such that one or more other microphones are not powered at the same time.

In a similar fashion, the (capacitor latency) time 522 of a first microphone can be initiated at a time different from a time 522 of a second microphone such that the two periods do not substantially overlap. The non- (or partially) overlapping (capacitor latency) times 522 helps ensure a more even consumption of power by sequentially (e.g., or alternating) powering up microphones such that the (at least) a portion of the power consumption of each microphone occurs at different times. Two or more microphones can be activated such that one or more other microphones are not powered at the same time.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A system, comprising:

a first switch having a first terminal operable to receive an analog input signal capacitively coupled from an acoustic sensor, the first switch operable to selectively couple the received analog input signal to a second terminal of the first switch during a first on-time, the analog input signal including a DC (direct current) component for powering the acoustic sensor and including an AC (alternating current) component for conveying information quantities received when the acoustic sensor is powered by the DC component;

a second switch having a first terminal coupled to a second terminal of the first switch, the second switch operable to selectively couple the first-switch coupled analog input signal to ground during a first settling time that occurs during the first on-time;

an amplifier having an input coupled to a second terminal of the first switch, the amplifier operable to amplify the AC component during the first on-time and after the first settling-time; and feature extraction circuitry for extracting sparse sound parameter information from the amplified AC components, the sparse sound parameter information being associated with the first on-time;

including feature pre-screen logic circuitry for determining whether a match exists between the extracted sparse sound parameter information and stored truncated sound signatures, where the determination whether a match exists is made in response to the analog input signal exceeding a reference voltage.

2. The system of claim 1, comprising a processor for analyzing the extracted sparse sound parameter information to analyze the extracted sparse sound parameter information using stored sound signatures of higher resolution than the stored truncated sound signatures, wherein the processor is powered up in response to a determination that a match exists between the extracted sparse sound parameter information and stored truncated sound signatures.

3. The system of claim 2, wherein a parameter associated with the first on-time is selected in response to the analysis of the processor using stored sound signatures of higher resolution than the stored truncated sound signatures.

4. A method, comprising:

receiving an analog input signal capacitively coupled from an acoustic sensor, the analog input signal including a DC (direct current) component for powering the acoustic sensor and including an AC (alternating current) component for conveying information quantities received when the acoustic sensor is powered by the DC component;

selectively coupling the received analog input signal to an input of a buffer during a first on-time;

selectively grounding the analog input signal during a first settling-time that occurs during the first on-time; and amplifying the AC component during the first on-time and after the first settling-time;

determining whether a match exists between an extracted sparse sound parameter information and stored truncated sound signatures, where the determination whether a match exists is made in response to the analog input signal exceeding a reference voltage.

5. The method of claim 4, comprising analyzing the extracted sparse sound parameter information to analyze the extracted sparse sound parameter information using stored sound signatures of higher resolution than the stored truncated sound signatures.

6. The method of claim 5, comprising powering up a processor in response to a determination that a match exists between the extracted sparse sound parameter information and stored truncated sound signatures.

* * * * *